United States Patent
Myers

(10) Patent No.: US 9,491,939 B2
(45) Date of Patent: Nov. 15, 2016

(54) TOP MOTOR BROADCAST SPREADER APPARATUS

(71) Applicant: Anthony Myers, San Antonio, TX (US)

(72) Inventor: Anthony Myers, San Antonio, TX (US)

( * ) Notice: Subject to any disclaimer, the term of this patent is extended or adjusted under 35 U.S.C. 154(b) by 57 days.

(21) Appl. No.: 14/284,773

(22) Filed: May 22, 2014

(65) Prior Publication Data

US 2015/0336118 A1 Nov. 26, 2015

(51) Int. Cl.
| | | |
|---|---|---|
| *A01C 17/00* | (2006.01) | |
| *A01M 25/00* | (2006.01) | |
| *E01C 19/20* | (2006.01) | |
| *A01K 5/00* | (2006.01) | |
| *A01M 9/00* | (2006.01) | |

(52) U.S. Cl.
CPC .......... *A01M 25/006* (2013.01); *A01C 17/001* (2013.01); *A01K 5/00* (2013.01); *A01M 9/0061* (2013.01); *E01C 19/20* (2013.01); *E01C 19/203* (2013.01)

(58) Field of Classification Search
CPC . B05B 3/085; A01M 25/006; A01M 9/0061; A01C 17/001; A01C 17/005; A01K 5/00; A01K 5/02; A01K 5/0225; E01C 19/20; E01C 19/203; E01C 19/202
USPC .......................... 239/681, 684, 689, 687, 688
See application file for complete search history.

(56) References Cited

U.S. PATENT DOCUMENTS

| | | | |
|---|---|---|---|
| 2,934,037 A | 4/1960 | Ernest | |
| 3,195,508 A | 7/1965 | Lehman, et al. | |
| 4,027,627 A | 6/1977 | Fillion | |
| 4,945,859 A | 8/1990 | Churchwell | |
| 4,986,220 A | 1/1991 | Reneau et al. | |
| 5,143,289 A | 9/1992 | Gresham et al. | |
| 5,361,988 A * | 11/1994 | Nelson | B60B 39/06 198/676 |
| 5,820,035 A * | 10/1998 | Johnson | A01C 17/005 239/684 |
| 7,222,583 B2 | 5/2007 | Foster | |
| 7,306,175 B1 | 12/2007 | Farmer | |
| 7,753,293 B2 | 7/2010 | Farmer | |
| 7,849,816 B2 * | 12/2010 | Dollar, Jr. | A01K 5/0225 119/57.91 |
| 7,866,579 B2 | 1/2011 | Chism | |
| 7,954,454 B2 | 6/2011 | Lewis | |
| 8,474,735 B2 * | 7/2013 | Hobbs, Jr. | A01C 15/006 239/650 |
| 8,607,736 B1 * | 12/2013 | Plant | A01K 61/02 119/57.91 |
| 9,033,188 B2 * | 5/2015 | Kotaki | B65D 88/68 222/217 |

* cited by examiner

*Primary Examiner* — Arthur O Hall
*Assistant Examiner* — Juan C Barrera

(57) ABSTRACT

A top motor broadcast spreader having a container for storing material and having an opening at its lower end for releasing material from the container. A closure spreader member below the container covers container opening and is movable downward away from the opening to release and spread material onto a surface. A motor is mounted inside the container and above the opening at the lower end of the container having a motor shaft extending downwardly from the motor through the opening at the lower end of the container and is connected to the closure spreader member to move the closure spreader member downward upon rotation of the motor shaft to release and spread material onto a surface. The closure spreader member comprises a flat horizontal and circular plate having flat rectangular spreader flaps extending vertically up and flat rectangular spreader flaps extending vertically down in an alternating pattern on the circular plate.

5 Claims, 6 Drawing Sheets

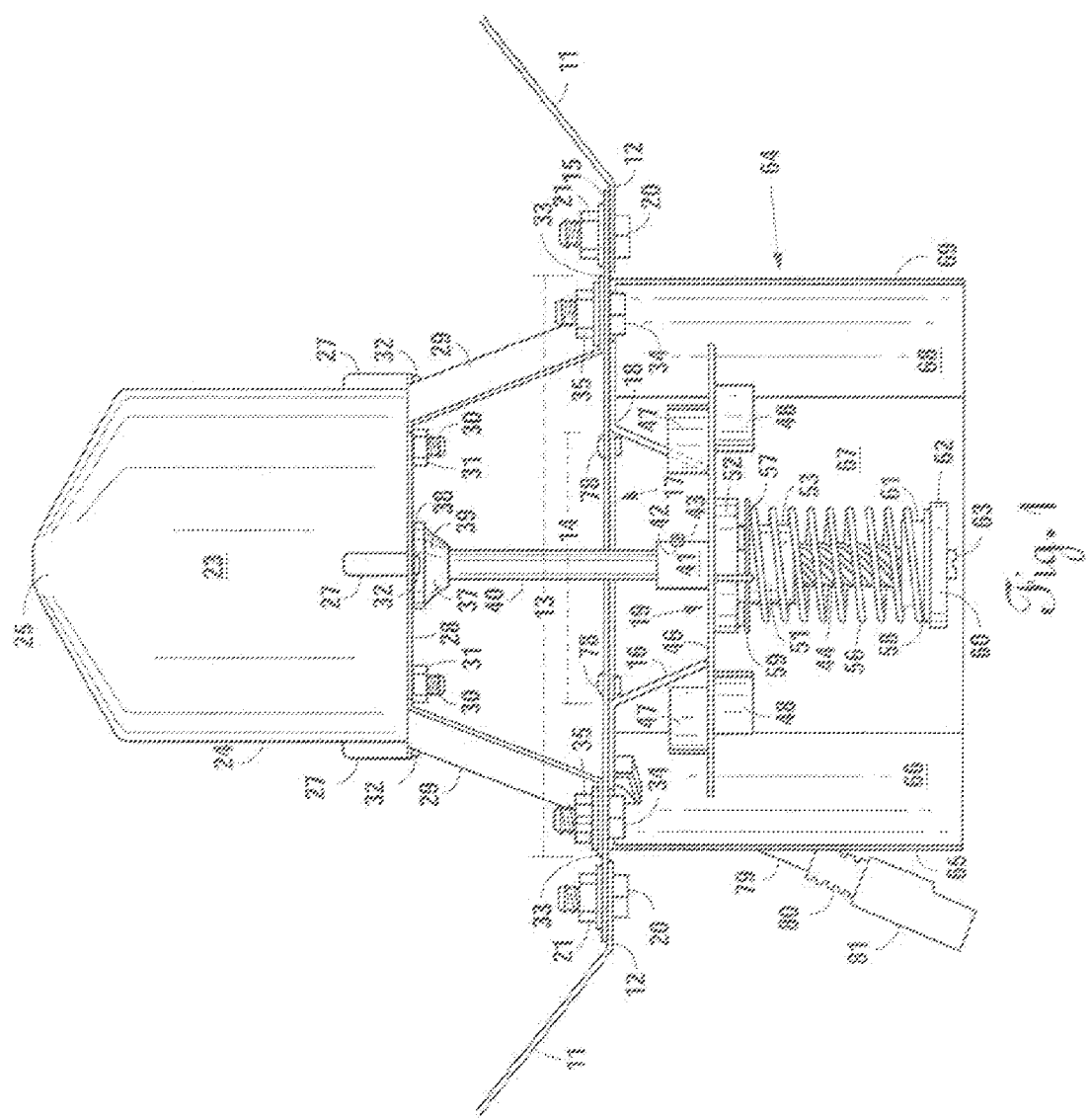

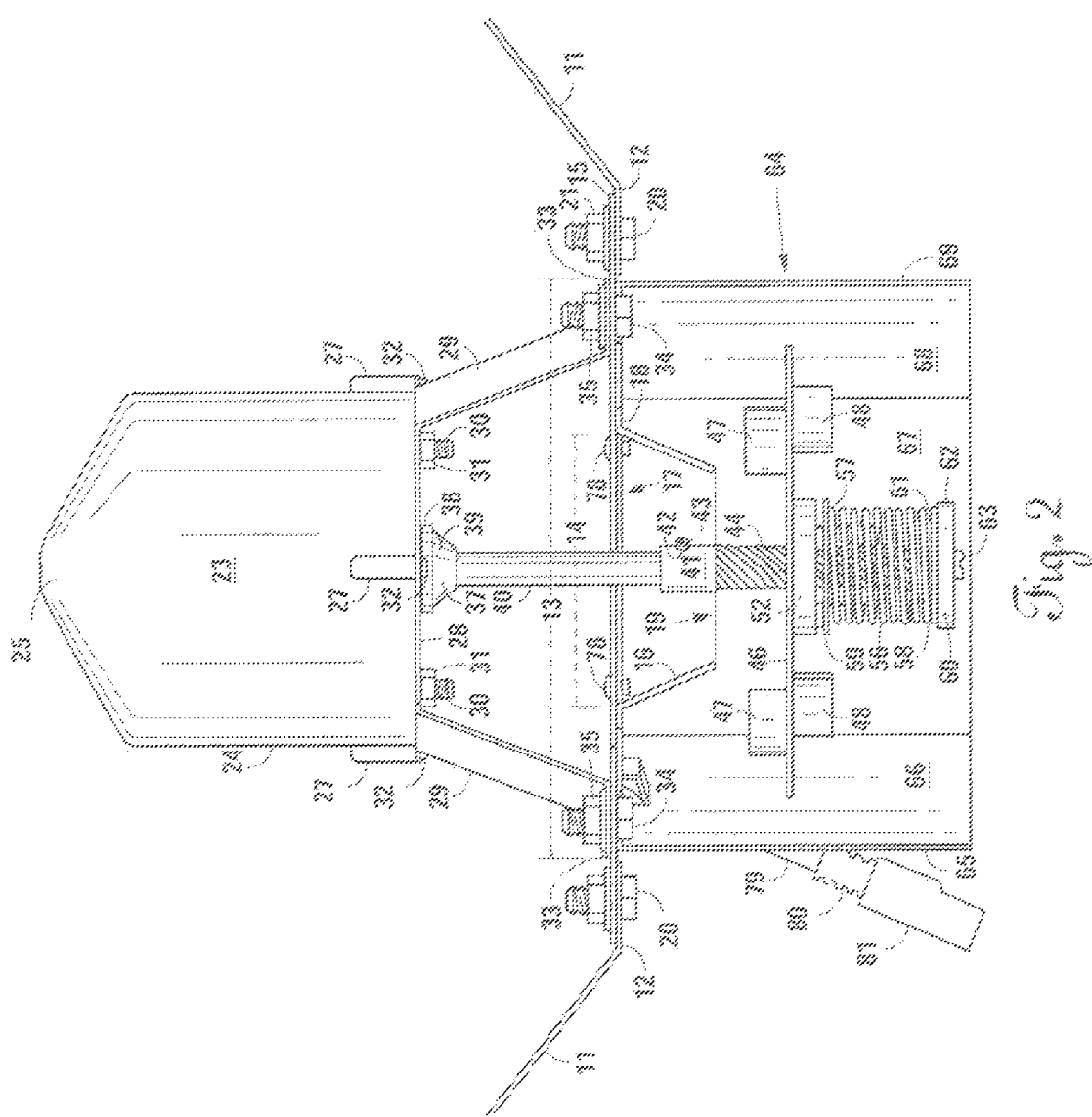

Figure 6:
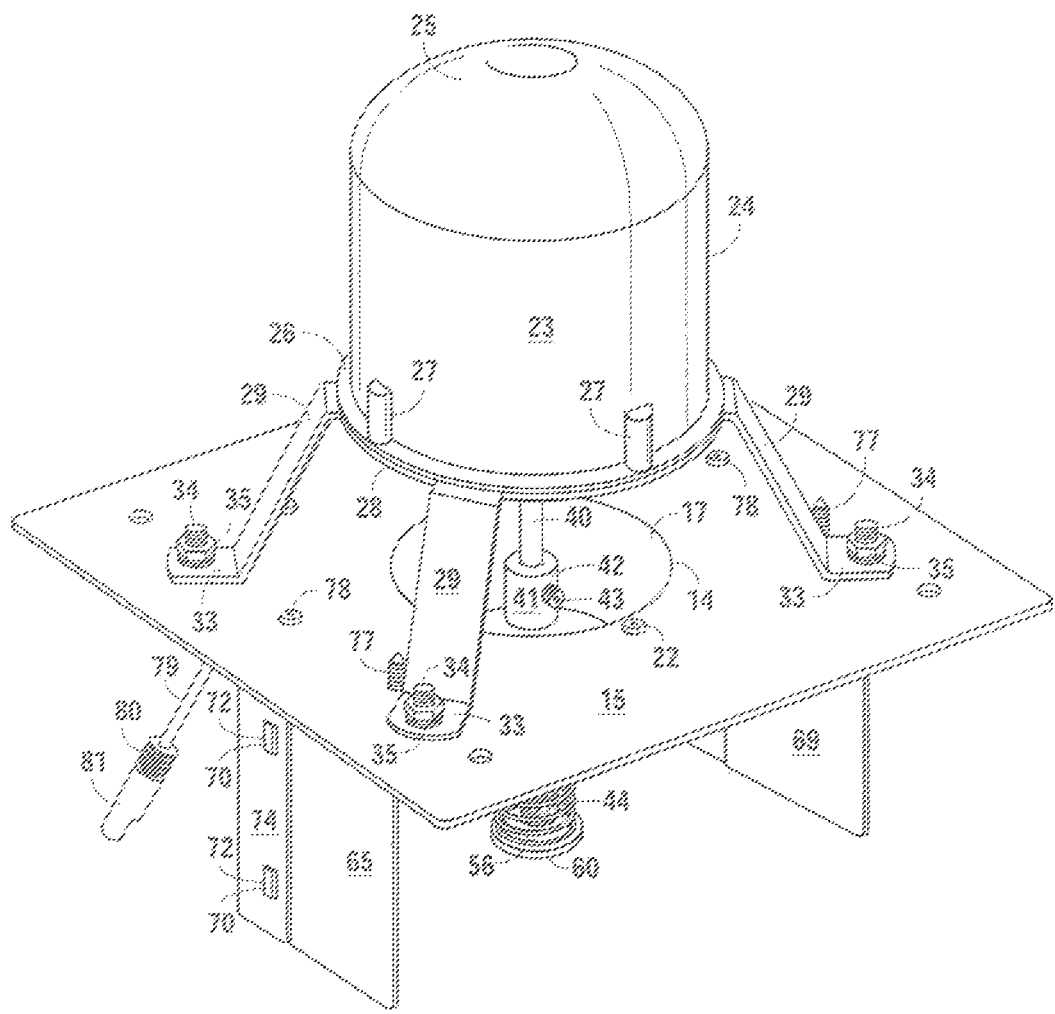

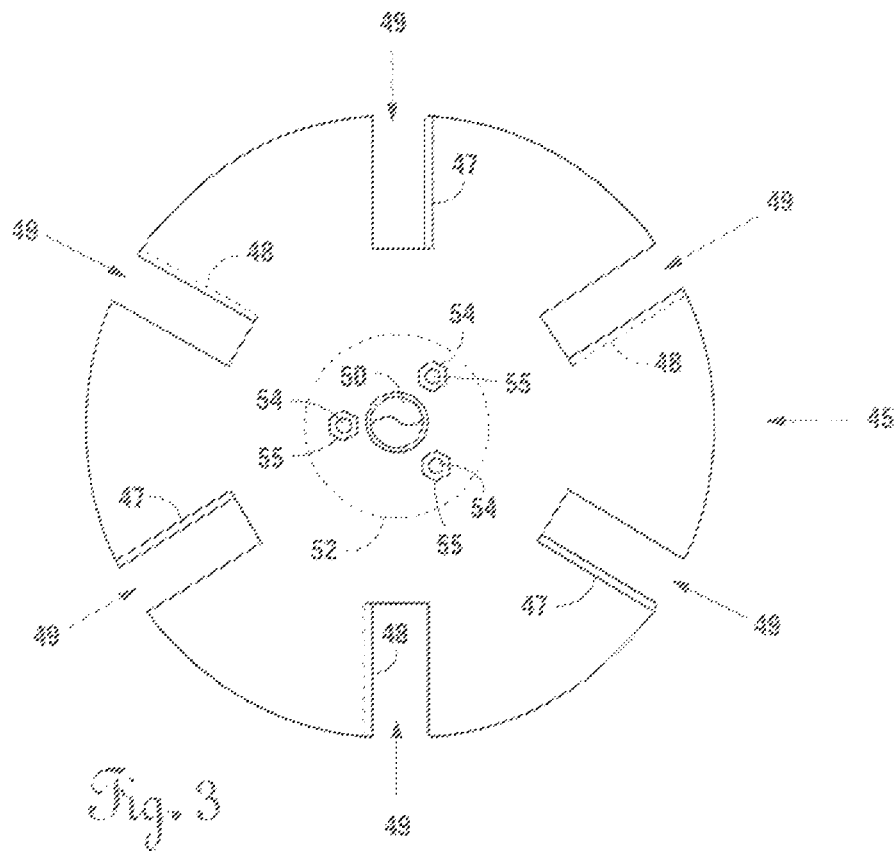
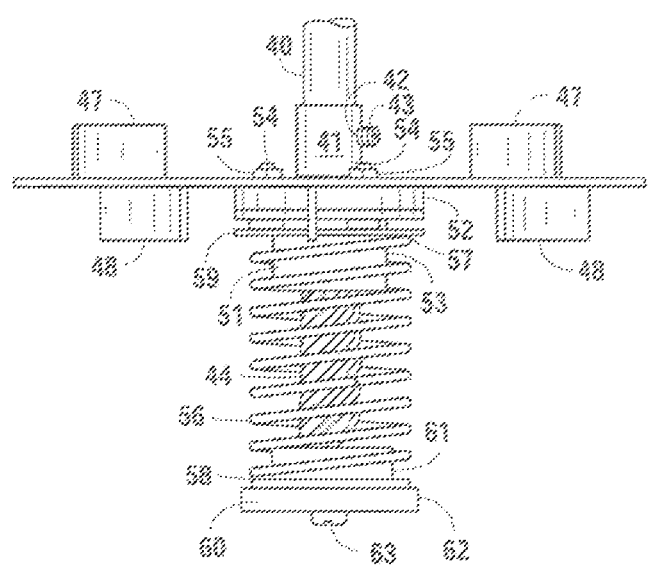

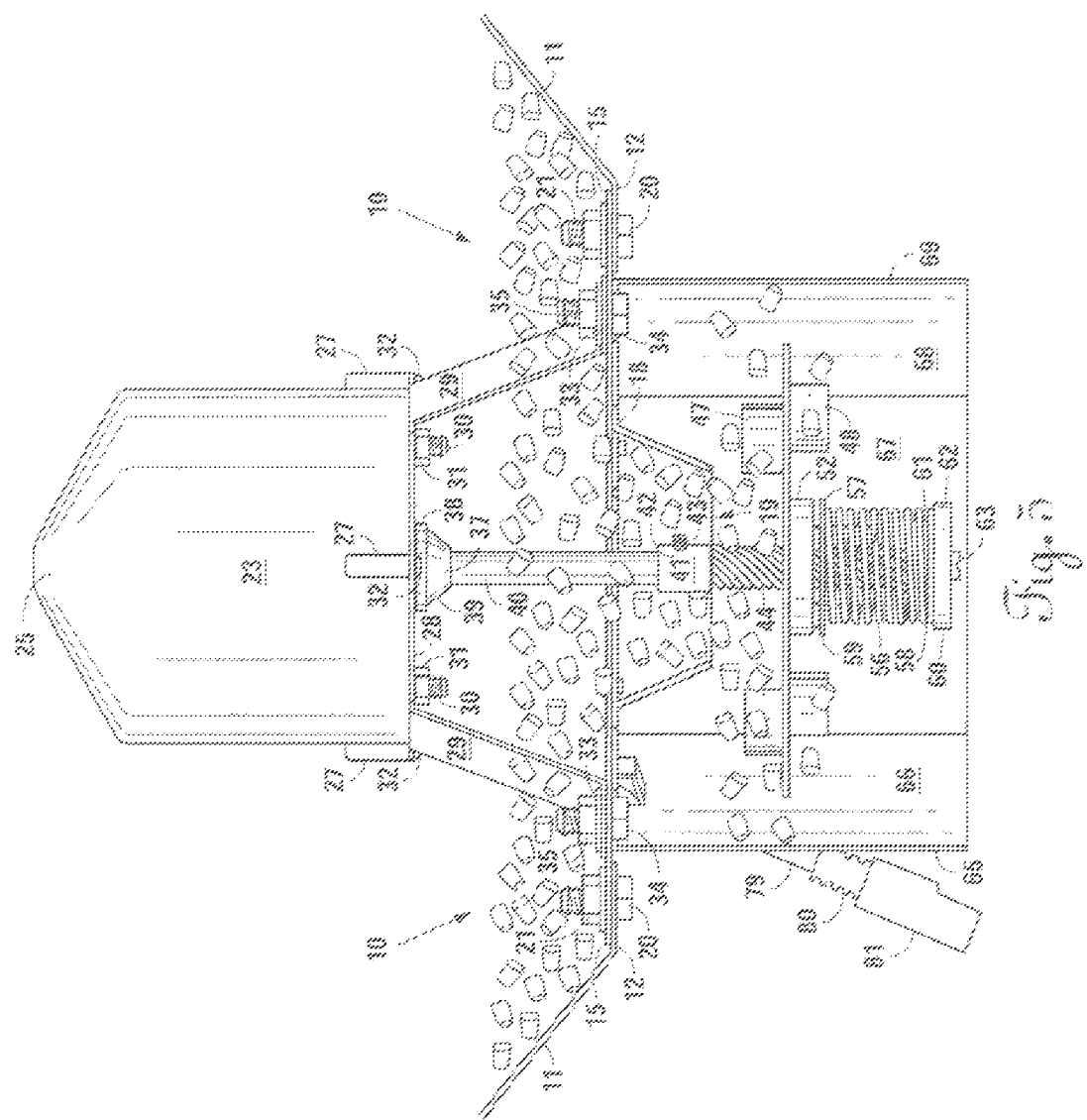

TOP MOTOR BROADCAST SPREADER APPARATUS

BACKGROUND OF THE INVENTION

1. Field of the Invention

The invention relates to an improved apparatus for broadcast spreading particulate material onto a variety of outdoor surfaces while mounted to a moving vehicle or stationary structure.

2. Description of the Related Art

A broadcast spreader (also known as a rotary spreader) is a device commonly used to distribute particulate material in a calibrated spread pattern onto a variety of outdoor surfaces. The particulate material may be powdered, granulated, or aggregated matter, such as fertilizers, herbicides, pesticides, seeds, pelletized lime, grains, sands, salts, animal feeds, food plot products, and the like. Suitable outdoor surfaces include fields, pastures, golf courses, lawns, roads, driveways, sidewalks, and lands and bodies of water used by domesticated animals, game animals, livestock, wildlife, birds, or fish.

A broadcast spreader differs from a drop spreader because a broadcast spreader distributes particulate material out and away from the device while a drop spreader only distributes material down, below the device. As a result, a broadcast spreader can cover a given surface area with particulate material more efficiently and effectively, making it a preferred alternative to using a drop spreader. A broadcast spreader may also be fitted with directional fins or a directional assembly to control the direction the particulate material is thrown from the device. A typical broadcast spreader generally comprises a container having at least one outlet port, a spreader member positioned below the container's outlet port(s), a means for releasing the particulate material from the container, and a means for rotating the spreader member to distribute the particulate material over a given surface area.

Such a broadcast spreader may be mounted on a self-propelled vehicle such as a tractor, an all-terrain vehicle, a utility vehicle, a truck or the like, or on a separate cart or trailer towed behind a self-propelled vehicle or carried by a person. Alternatively, a broadcast spreader may be mounted on wheels with a handle for a person to manually push or pull the device across a given surface area. A broadcast spreader may also be mounted on a stationary structure such as a game feeder support assembly for feeding wildlife, or a dock, flotation device, or the like for feeding fish.

Some types of such broadcast spreaders have means for closing the outlet port(s) such as sliding gates and the like, and others have no closure means but instead rely on particulate material piling up on the spreader member to block the outlet port(s) when the spreader member is not being rotated to distribute the particulate material. It has been found in practice that the mechanisms used to start and stop the release of particulate material through the outlet port(s) of such broadcast spreaders are inadequate to prevent leakage, spillage, or jamming of particulate material, or to protect particulate material in the container from exposure to moisture. Accordingly, U.S. Pat. No. 5,820,035 to Johnson et al., which is incorporated herein by reference, describes an improved broadcast spreader mechanism that includes a spreader apparatus and method for providing positive closure of the container's outlet port as soon as the motive power for the spreader member is stopped.

Unlike the prior art in Johnson et al., the instant invention positions the motor, which rotates the spreader member, inside the container and above the outlet port and spreader member rather than below the spreader member. Other examples of broadcast spreader mechanisms that include a motor positioned below the spreader member are described in U.S. Pat. No. 7,222,583 to Foster et al., U.S. Pat. No. 7,306,175 to Farmer, U.S. Pat. No. 7,753,293 to Farmer, and U.S. Pat. No. 7,866,579 to Chism. It has been found in practice that having the motor positioned below the spreader member requires higher mounting of the broadcast spreader for better ground clearance and exposes the motor to damage from the elements, varmints, and objects colliding with the motor.

A stationary feed dispensing apparatus is described in U.S. Pat. No. 7,849,816 to Dollar, Jr. et al., which uses a motor mounted within a hopper to rotate a motor shaft connected to a fan blade positioned below a plurality of small openings in the base of the hopper. The apparatus lacks any means to close the small openings in the base of the hopper and allows feed to pile up on a sheet of metal mounted below the hopper when the fan blade is not rotating. The apparatus also dispenses feed in all directions through the gap between the base of the hopper and the sheet of metal. Such an arrangement would be unsuitable for the distribution of many other types of particulate material for their intended purposes. This apparatus is also unsuitable for use on moving equipment because of its susceptibility to leakage and spillage and lack of any means to control the direction the feed is thrown from the device. Even when used as a stationary feed dispenser, the apparatus lacks a means of protecting the feed from exposure to moisture or preventing spillage if the apparatus is bumped, jiggled, or tipped over. The apparatus also requires the motor to be fixedly attached to the base of the hopper separate from the plurality of small openings, which enables some of the feed around the motor not subject to the pull of gravity to remain in the hopper rather than fall through one of the small openings.

It is an object of the invention to start and stop the release of particulate material with the motor positioned within the container and connected to a spreader mechanism that provides for positive closure of the container's outlet port, which prevents leakage, spillage, or jamming of particulate material and protects particulate material in the container from exposure to moisture. It is another object of the invention to position the motor above the opening at the base of the container without blocking particulate material from being released from the container. It is another object of the invention to avoid exposure of the motor to damage from the elements, varmints, and objects colliding with the motor. It is another object of the invention to provide better ground clearance when the broadcast spreader is mounted lower to the ground, such as on a small vehicle or suspended wildlife feeder, which further improves access for filling the container at a lower level.

BRIEF SUMMARY OF THE INVENTION

An embodiment of the present invention is directed to a broadcast spreader, comprising a container for storing material and having an opening at its lower end for releasing material from the container, a closure spreader member below the container that covers the opening at the lower end of the container and is movable downward away from the opening of the container to release and spread material onto a surface, a motor mounted inside the container and above the opening at the lower end of the container, a motor shaft extending downwardly from the motor through the opening at the lower end of the container and fitted to the closure spreader member to move the closure spreader member downward upon rotation of the motor shaft to release and spread material onto a surface, and a closure spring positioned around the motor shaft and below the closure spreader member to move the closure spreader member upward upon the non-rotation of the motor shaft to cover the opening at the lower end of the container.

The broadcast spreader further comprises a spreader shield having one or more sides partially circumscribing the closure spreader member to directionally restrict the spreading of material.

It is a further embodiment of the invention that the broadcast spreader comprise a base support member attached to the lower end of the container, having a surface for mounting the motor and an opening for releasing material from the container and through which the motor shaft extends downwardly.

An object of the invention is a funnel mounted below the base support member of the broadcast spreader, having a stem at its lower end for releasing material from the container upon rotation of the motor shaft and for contacting the top surface of the closure spreader member to stop the release of material from the container upon non-rotation of the motor shaft, and through which the motor shaft extends downwardly. The motor shaft has a lower threaded portion fitted to the closure spreader member to move the closure spreader member downward upon rotation of the motor shaft. The closure spreader member has an internally threaded coupler fitted to the threaded portion of the motor shaft to move the closure spreader member downward upon rotation of the motor shaft.

A further object of the invention is a closure spring positioned above a lower spring member attached to the lower end of the motor shaft to support and compress the spring as the closure spreader member moves downward upon rotation of the motor shaft. The rotation of the motor shaft causes the closure spreader member to rotate as it moves down the motor shaft and to continue rotating when compression of the closure spring stops the closure spreader member from moving further down the motor shaft. The closure spreader member has raised surface projections for outwardly propelling material released from the lower end of the container upon rotation of the closure spreader member. The motor has a conventional power cable to connect the motor to a conventional source for supplying power to the motor.

It is an object of the invention to start and stop the release of particulate material with the motor positioned within the container and connected to a spreader mechanism that provides for positive closure of the container's outlet port, which prevents leakage, spillage, or jamming of particulate material and protects particulate material in the container from exposure.

It is an object of the invention to start and stop the release of particulate material with the motor positioned within the container and connected to a spreader mechanism that provides for positive closure of the container's outlet port, which prevents leakage, spillage, or jamming of particulate material and protects particulate material in the container from exposure to moisture.

It is another object of the invention to position the motor above the opening at the base of the container without blocking particulate material from being released from the container.

It is another object of the invention to avoid exposure of the motor to damage from the elements, varmints, and objects colliding with the motor.

It is another object of the invention to provide better ground clearance when the broadcast spreader is mounted lower to the ground, such as on a small vehicle or suspended wildlife feeder, which further improves access for filling the container at a lower level.

BRIEF DESCRIPTION OF THE SEVERAL VIEWS OF THE DRAWINGS

FIG. 1 is a cross-sectional front view drawing of the invention showing the claimed broadcast spreader when the closure spreader member is not rotating.

FIG. 2 is a cross-sectional front view drawing of the invention showing the claimed broadcast spreader when the closure spreader member is rotating.

FIG. 3 is a top view drawing of the closure spreader member.

FIG. 4 is a side view drawing of the closure spreader member fitted to the threaded rod attached to the lower end of the motor shaft.

FIG. 5 is a cross-sectional front view drawing of the invention showing the claimed broadcast spreader in use to release and spread particulate material from the container.

FIG. 6 is an isometric drawing of the invention showing a top-angled perspective view of the claimed broadcast spreader.

FIG. 7 is an isometric drawing of the invention showing a bottom-angled perspective view of the claimed broadcast spreader.

DETAILED DESCRIPTION OF THE INVENTION

A preferred embodiment of the invention generally comprises a container (not fully shown), a flat horizontal base support member 15, an electric motor 23, a cylindrical motor shaft 40, a cylindrical threaded rod 44, a closure spreader member 45, a closure spring 56, and a spreader shield 64. The container includes a lower sidewall section 11 extending down on all sides at an inward angle into an inwardly oriented horizontal lower flange 12 circumscribing a horizontal opening 13 at the container's base. The container stores particulate material 10 for the broadcast spreader mechanism. The particulate material 10 may be powdered, granulated, pelletized, or otherwise aggregated matter, such as fertilizers, herbicides, pesticides, seeds, pelletized lime, grains, sands, salts, animal feeds, food plot products, and the like.

The flat horizontal base support member 15 extends across the opening 13 at the container's base to overlap and mount on top of the container's lower flange 12 on all sides. Threaded bolts 20 inserted vertically up through aligned apertures in the container's lower flange 12 and the base support member 15 securely fasten the base support member 15 to the container's lower flange 12 with hex nuts 21 tightened down onto the threaded bolts 20 above the base support member 15. In the center of the base support member 15 is a horizontal round opening 14 through which particulate material 10 is pulled down by gravity into a funnel 16 aligned below the round opening 14 and mounted to the bottom of the base support member 15. The upper mouth of the funnel 17 has an outwardly oriented horizontal flange 18 securely fastened to the bottom of the base support member 15 by suitable means such as rivets 22 (see FIG. 7).

The lower edge 16a of the funnel 17 is generally flat and acts as a seal to keep material in the container until it is desired to release it. The opening 19 in the lower end of the funnel allows passage of material out of the container. The diameter of the round opening 14 in the base support member 15 is equal to or no greater than the diameter of the upper mouth of the funnel 17. The diameter of the upper mouth of the funnel 17 is greater than the diameter of the lower opening 19 of the funnel 16. The diameter of the lower opening 19 is wide enough to accommodate a variety of particulate material 10 for broadcast spreading in sufficient quantity.

The electric motor 23 is positioned in the center space of the container above the round opening 14 of the base support member 15 and mounted on top of a flat horizontal and circular motor support bracket 28. Threaded bolts 30 inserted vertically down through aligned apertures in the motor 23 and the motor support bracket 28 securely fasten the motor 23 to the motor support bracket 28 with hex nuts 31 tightened onto the threaded bolts 30 below the motor support bracket 28. Flat and rectangular bracket support arms 29 extend vertically down at slight outward angles from the outer edge of the motor support bracket 28 to the top surface of the base support member 15 and into outwardly oriented horizontal lower flanges 33. Threaded bolts 34 inserted vertically up through aligned apertures in the base support member 15 and the lower flanges 33 of the bracket support arms 29 securely fasten the bracket support arms 29, and thereby the motor support bracket 28 and the motor 23, to the base support member 15 with hex nuts 35 tightened down onto the threaded bolts 34 above the lower flanges 33 of the bracket support arms 29. The diameter of the motor support bracket 28 is greater than the diameter of the round opening 14 in the base support member 15.

A cylindrical cover 24 with an inverted cone-shaped top 25 and outwardly flared bottom lip 26 (see FIGS. 6 and 7) provides a protective barrier between the motor 23 and particulate material 10 within the container. The diameter of the cover 24 is slightly less than the diameter of the motor support bracket 28, and the diameter of the cover's bottom lip 26 equals the diameter of the motor support bracket 28. Cylindrically flared screw receptacles 27 protrude outwardly from the lower sidewall of the cover 24 and vertically down to the cover's bottom lip 26 such that the outermost edges of the screw receptacles 27 align with the outer edge of the motor support bracket 28. Cover screws 32 inserted vertically up through apertures in the motor support bracket 28 and internally threaded aligned holes in the screw receptacles 27 securely fasten the cover 24 to the motor support bracket 28.

The cylindrical motor shaft 40 extends vertically down from the bottom of the motor 23 through a round opening 36 in the center of the motor support bracket 28 to the center space of the funnel 16. A motor coupler 37 having a cylindrical upper portion 38 and a semi-spherical lower portion 39 secures the upper end of the motor shaft 40 to the bottom of the motor 23 by conventional means. The diameter of the round opening 36 in the motor support bracket 28 is greater than the diameter of the motor coupler 37. The upper end of the motor shaft 40 fits securely in the center hole of the motor coupler 37 such that rotation by the motor 23 of the motor coupler 37 thereby rotates the motor shaft 40.

The cylindrical threaded rod 44 extends vertically down from the center space of the funnel 16 to a predetermined length of several inches below the bottom edge of the lower stem of the funnel 19. The proper length of the threaded rod 44 may be determined by conventional means based on the types of particulate material 10 for which the claimed broadcast spreader mechanism will be used. A cylindrical motor shaft coupler 41 secures the lower end of the motor shaft 40 to the upper end of the threaded rod 44 with a set screw 43 inserted perpendicularly through an internally threaded aperture 42 in the side of the motor shaft coupler 41 at the mid-point between the coupler's top and bottom edges. The lower end of the motor shaft 40 fits securely in the upper center hole of the motor shaft coupler 41, and the upper end of the threaded rod 44 fits securely in the lower center hole of the motor shaft coupler 41 such that rotation of the motor shaft 40 thereby rotates the threaded rod 44.

As more fully shown in FIG. 3 and FIG. 4, the closure spreader member 45 comprises a flat horizontal and circular plate 46 having flat rectangular upper spreader flaps 47 extending vertically up and flat rectangular loser spreader flaps 48 extending vertically down in an alternating pattern around the outer portion of the circular plate 46. The lower edge 16*a* of the funnel 16 engages the upper surface of the plate 46 to prevent material from being released when the edge and surface are in contact. Each of the spreader flaps 47 and 48 has the outer edge of the circular plate 46 as one side, is cut out from the circular plate 46 on two sides, and is bent up or down at a generally ninety degree angle on the remaining side that extends from the circular plate 46, such that the spreader flaps 47 and 48 have corresponding rectangular cut out openings 49 around the outer portion of the circular plate 46. During operation some material may go through the openings 49 and may be impacted by the lower spreader flaps.

The circular plate 46 has a round opening 50 in its center through which the threaded rod 44 extends down. The diameter of the plate's center opening 50 is slightly greater than the diameter of the threaded rod 44. The center portion of the circular plate 46 is mounted on top of a spreader coupler 51 having a horizontally circular upper portion 52 and a cylindrical lower portion 53. Coupler screws 54 inserted vertically up through aligned apertures in the spreader coupler's upper portion 52 and the center portion of the circular plate 46 securely fasten the circular plate 46 to the spreader coupler 51 with hex nuts 55 tightened down onto the coupler screws 54 above the center portion of the circular plate 46.

The closure spreader member 45 is fitted to the threaded rod 44 through the mating of internal threads in the center hole of the spreader coupler 51 with corresponding external threads on the threaded rod 44. Thus, rotation of the motor shaft 40 and the threaded rod 44 by the motor 23 generates friction between the internal threads in the center hole of the spreader coupler 51 and corresponding external threads on the threaded rod 44. This causes the closure spreader member 45 to rotate and move down the length of the threaded rod 44 to release and spread particulate material 10 when the broadcast spreader mechanism is in use. As the closure spreader member 44 rotates, the vertically alternating flaps 47 and 48 around the outer portion of the circular plate 46 store kinetic energy generated from the centrifugal force of the rotation and make contact with particulate material 10 as it falls down from the funnel 16 and moves along the surface of the circular plate 46. Contact between the vertically alternating flaps 47 and 48 and particulate material 10 releases the kinetic energy to propel the particulate material 10 horizontally away from the closure spreader member 45.

The closure spring 56 is positioned vertically around the threaded rod 44 and spreader coupler's lower portion 53 below the spreader coupler's upper portion 52 and closure spreader member 45. The diameter of the closure spring 56 is greater than the diameter of the threaded rod 44 such that the closure spring 56 does not contact the threaded rod 44. A flat horizontally circular upper spring support 59 is positioned around the spreader coupler's lower portion 53 between the bottom of the spreader coupler's upper portion 52 and the upper end of the closure spring 57. The top of the upper spring support 59 contacts the heads of the coupler screws 54, and the bottom of the upper spring support 59 contacts the upper end of the closure spring 57. The diameter of the upper spring support 59 is equal to the diameter of the spreader coupler's upper portion 52 and greater than the diameter of the closure spring 56. A lower spring support 60 having a horizontally circular upper portion 61 and horizontally circular lower portion 62 is positioned around the lower end of the threaded rod 44 below the lower end of the closure spring 58. The diameter of the lower spring support's upper portion 61 is less than the diameter of the closure spring 56 and the lower spring support's lower portion 62, and the diameter of the lower spring support's lower portion 62 is greater than the diameter of the closure spring 56. The lower end of the closure spring 58 is positioned around the lower spring support's upper portion 61 and contacts the top of the lower spring support's lower portion 62. A spring support screw 63 inserted vertically up through aligned internally threaded apertures in the center of the lower spring support 60 and the center of the threaded rod 44 securely fastens the lower spring support 60 to the lower end of the threaded rod 44.

Residual tension in the coils of the closure spring 56 presses the upper end of the closure spring 57 up against the bottom of the upper spring support 59. This precipitates the application of pressure against the bottom of the spreader coupler's upper portion 52 and causes the top of the closure spreader member 45 to maintain contact with the bottom edge of the lower stem of the funnel 19 to prevent the release of particulate material 10 when the motor 23 is not rotating the closure spreader member 45. As shown in FIG. 2 and FIG. 5, rotation of the closure spreader member 45 down the length of the threaded rod 44 causes the bottom of the spreader coupler's upper portion 52 to press down against the top of the upper spring support 59, and the lower end of the closure spring 58 to press down against the top of the lower spring support's lower portion 62. As a result, this causes the application of pressure against the upper and lower ends of the closure spring 57 and 58, which therefore compresses and stores mechanical energy within the coils of the closure spring 56. Compression of the coils of the closure spring 56 enables the closure spreader member 45 to continue to rotate but not move farther down the length of the threaded rod 44. When the motor 23 is no longer rotating the closure spreader member 45, the mechanical energy stored in the compressed coils of the closure spring 56 is released to press the upper end of the closure spring 57 against the bottom of the upper spring support 59 and spreader coupler's upper portion 52. This causes the closure spreader member 45 to move up the length of the threaded rod 44 until the top of the closure spreader member 45 contacts the bottom edge of the lower edge of the funnel 19, which stops the release of particulate material 10.

The spreader and deflector shield 64 comprises five thin vertical rectangular sides 65 (left), 66 (left rear), 67 (rear), 68 (right rear), and 69 (right), forming a semi-octagonal barrier around the funnel 16, threaded rod 44, closure spreader member 45, spreader coupler 51, closure spring 56, and closure spring supports 59 and 60, below the base support member 15. Raised vertical flaps 70 protruding from the outer surface of left side 65 are inserted through corresponding open vertical slots 72 in angled vertical flap 74 extending from the front of left rear side 66 to attach left side 65 to left rear side 66 (see FIG. 6). Raised vertical flaps 71 protruding from the outer surface of right side 69 are inserted through corresponding open vertical slots 73 in angled vertical flap 75 extending from the front of right rear side 68 to attach right side 69 to right rear side 68. At the top of sides 65, 66, 67, 68, and 69 and angled vertical flaps 74 and 75 are inwardly oriented horizontal upper flanges 76. Shield screws 77 inserted vertically up through aligned apertures in upper flanges 76 and the base support member 15 securely fasten sides 65 and 69 and angled vertical flaps 74 and 75 to the bottom of the base support member 15. Upper flanges 76 of sides 66, 67, and 68 are securely fastened to the bottom of the base support member 15 by suitable means such as rivets 78 inserted vertically through aligned apertures in upper flanges 76 and the base support member 15. The spreader shield 64 provides a semi-octagonal barrier to prevent the closure spreader member 45 from propelling particulate material 10 horizontally across a range of about 225 degrees to the sides and rear of the broadcast spreader mechanism. Thus, the spreader shield 64 restricts the spreading of particulate material 10 horizontally across a range of about 135 degrees in front of the broadcast spreader mechanism and vertically down below the broadcast spreader mechanism. The range of the spreader can be varied by varying the horizontal circumference of the shield 64. The spreading of material is also affected by the vertical length of the shield 64. This can be done by varying the horizontal width of the side panels 65 and 69. The lower flaps 48 may assist in spreading material that is deflected off of the shield. Different size shields may be used to help control the desired degree of spreading of the material from the container.

Figure 7:
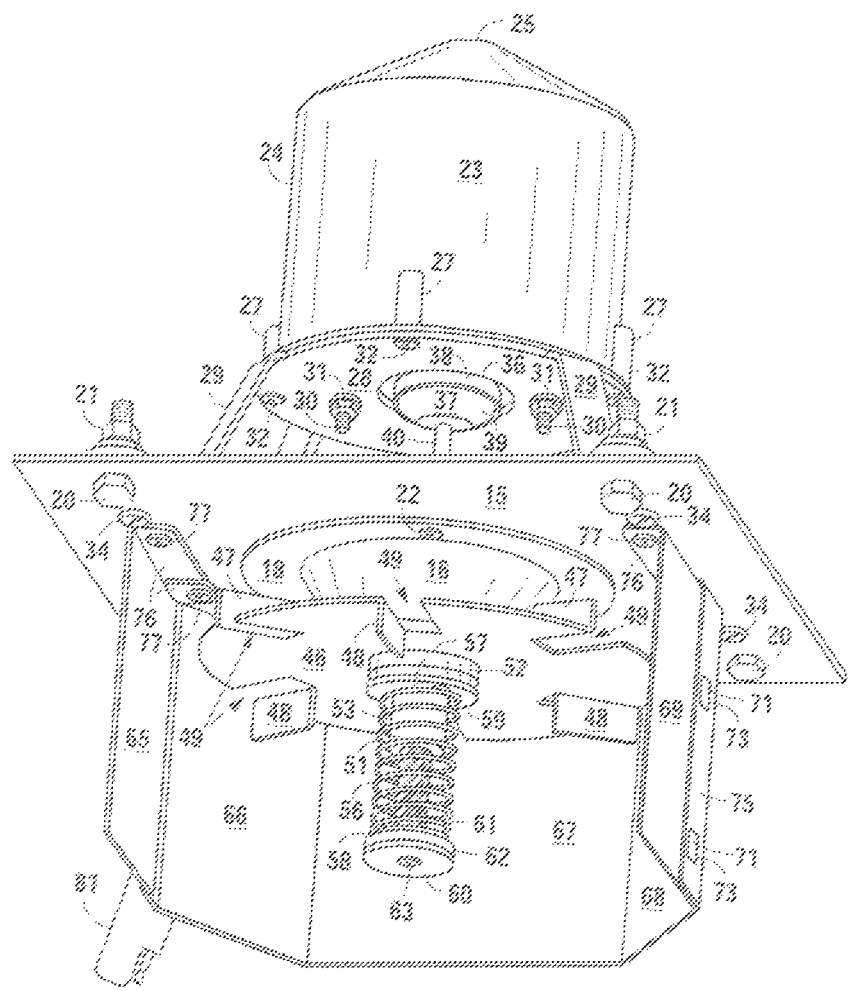

A conventional insulated electric power cable 79 extends down from the motor 23 along the backside of a bracket support arm 29 through apertures in the base support member 15 and left rear side 66 of the spreader shield 64 (see FIG. 6). A flexible molded strain relief 80 attaches the power cable 79 to a conventional electric power connector 81. The strain relief 80 reduces the risk of separation or breakage between the power cable 79 and power connector 81 during strenuous use of the broadcast spreader apparatus. A conventional external power source (not shown) is joined to the power connector 81 through conventional means to supply electricity up through the power cable 79 to the motor 23. Applying electricity from the conventional power source causes the motor 23 to operate the motor shaft 40, and thereby the threaded rod 44 and closure spreader member 45, as further described above. The RPM of the motor can also be varied to affect the degree of spreading of material.

Most components of the invention, including the container, base support member 15, funnel 16, motor cover 24, motor support bracket 28, motor shaft 40, threaded rod 44, closure spreader member 45, spreader coupler 51, and closure spring supports 59 and 60, may be made of any metal, plastic, or composite material suitable for the conditions under which the broadcast spreader mechanism will be used. The closure spring 56 is preferably made of a coiled metal with a tensile strength sufficient to move the closure spreader member 45 up the length of the threaded rod 44 and keep the top of the closure spreader member 45 pressed up against the bottom edge of the lower stem of the funnel 19 when the motor 23 is not rotating the motor shaft 40, but nonetheless allow the closure spreader member 45 to move down the length of the threaded rod 44 when the motor 23 is rotating the motor shaft 40 and threaded rod 44.

The above-listed sections and included information are not exhaustive and are only exemplary of the invention. The particular sections and included information in a particular embodiment may depend upon the particular implementation and the included devices and resources. Although a system and method according to the present invention have been described in connection with the preferred embodiments, it is not intended to be limited to the specific form set forth herein, but, on the contrary, it is intended to cover such alternatives, modifications, and equivalents as can be reasonably included within the spirit and scope of the invention as defined by the appended claims.

The invention claimed is:

1. A broadcast spreader, comprising:
    a container for storing material and having an opening at its lower end for releasing material from the container;
    a closure spreader member below the container that covers the opening at the lower end of the container and is movable downward away from the opening of the container to release and spread material onto the ground surface;
    a motor mounted inside the container and positioned above the opening at the lower end of the container;
    a rotating motor shaft extending downwardly from the motor through the opening at the lower end of the container and having a threaded portion at the lower end fitted to a threaded portion on the closure spreader member to move the closure spreader member downward on the motor shaft upon rotation of the motor shaft to release and spread material onto the ground surface;
    a closure spring positioned around and at the lower end of the motor shaft and below the closure spreader member to move the closure spreader member upward upon the non-rotation of the motor shaft to cover and seal the opening at the lower end of the container with the closure spreader member and to allow the closure spreader member to move downward to release and spread material onto the ground surface upon rotation of the motor shaft;
    a spreader shield having a deflecting surface partially circumscribing the closure spreader member to directionally restrict the spreading of material by the closure spreader member and to prevent the closure spreader member from propelling particulate material to the sides and rear of the broadcast spreader mechanism and restrict the spreading to front of the broadcast spreader mechanism and vertically down below the broadcast spreader mechanism;
    a base support member attached to the lower end of the container and extending above the opening, having a surface for mounting the motor above the opening for releasing material from the container and through which the motor shaft extends downwardly;
    a funnel member mounted below the base support member, having an opening at its lower end for releasing material from the container upon rotation of the motor shaft and for contacting the top surface of the closure spreader member to stop the release of material from the container upon non-rotation of the motor shaft, and through which the motor shaft extends downwardly;
    the closure spring is positioned above a lower spring support member attached to the lower end of the motor shaft to support and compress the spring as the closure spreader member moves downward upon rotation of the motor shaft; and
    rotation of the motor shaft causes the closure spreader member to rotate as it moves down the motor shaft and to continue rotating when compression of the closure spring stops the closure spreader member from moving further down the motor shaft.

2. The broadcast spreader of claim 1, wherein:
    the closure spreader member comprises a flat horizontal and circular plate having flat rectangular spreader flaps extending vertically up and flat rectangular spreader flaps extending vertically down in an alternating pattern around the outer portion of the circular plate.

3. The broadcast spreader of claim 2, wherein:
    each of the spreader flaps has the outer edge of the circular plate as one side, is cut out from the circular plate on two sides, and is bent up or down at a generally ninety degree angle on the remaining side that extends from the circular plate, such that the spreader flaps have corresponding rectangular cut out openings around the outer portion of the circular plate.

4. The broadcast spreader of claim 1, wherein:
    the closure spreader member has raised surface projections for outwardly propelling material released from the lower end of the container upon rotation of the closure spreader member.

5. The broadcast spreader of claim 1, wherein:
    the motor has a conventional power cable to connect the motor to a conventional source for supplying power to the motor.

* * * * *